No. 663,636. Patented Dec. 11, 1900.
C. T. McCUE.
CARRIAGE COUPLING.
(Application filed July 20, 1898.)
(No Model.)
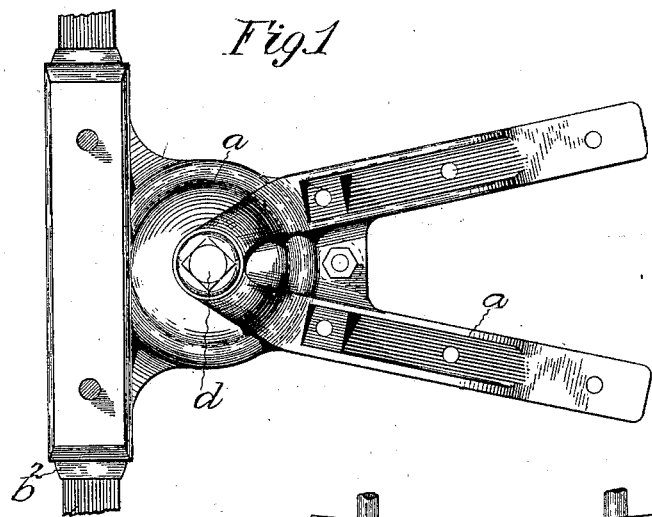
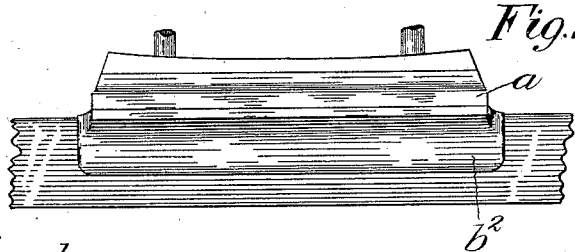
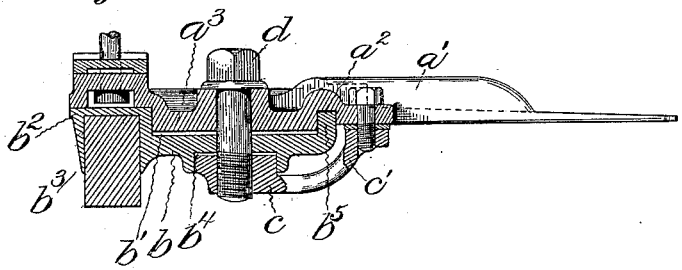
Witnesses:
William H. Barker
Emma P. Coffin
Inventor:
Charles T. McCue
By Chas. L. Burdett,
Attorney.
THE NORRIS PETERS CO., PHOTO-LITHO., WASHINGTON, D. C.

UNITED STATES PATENT OFFICE.

CHARLES T. McCUE, OF HARTFORD, CONNECTICUT, ASSIGNOR TO THE PREMIER MANUFACTURING COMPANY, OF SAME PLACE.

CARRIAGE-COUPLING.

SPECIFICATION forming part of Letters Patent No. 663,636, dated December 11, 1900.

Application filed July 20, 1898. Serial No. 686,458. (No model.)

*To all whom it may concern:*

Be it known that I, CHARLES T. McCUE, a citizen of the United States, and a resident of Hartford, in the county of Hartford and State of Connecticut, have invented certain new and useful Improvements in Carriage-Couplings, of which the following is a full, clear, and exact description, whereby any one skilled in the art can make and use the same.

My invention relates to the class of devices used for connecting the front and rear axles of a vehicle; and the object of my invention is to provide a device of this class that shall be strong and durable, one in which the parts may be readily assembled or taken apart, and one in which the action shall be easily adjusted.

To this end my invention consists in the device as a whole, in the combination of parts making up the device, and in details of such parts and their combination, as hereinafter described, and more particularly pointed out in the claims.

Referring to the drawings, Figure 1 is a top or plan view of my improved coupling. Fig. 2 is an end view of the same. Fig. 3 is a detail view, in lengthwise section, through the coupling on a line passing through the center of the king-bolt.

In the accompanying drawings, the letter $a$ denotes the upper half of a coupling provided with extensions $a'$ for attachment to the usual perches connecting the two axles, $a^2$ a groove formed in the under side of the half $a$, and $a^3$ a boss located underneath the part $a$.

The letter $b$ denotes the lower half of the coupling, having a central depression $b'$ for the reception of the boss $a^3$ on the part $a$, and a forward extension $b^2$, in which is located a groove $b^3$ for the reception of an axle. A socket $b^4$ is formed underneath the part $b$ for the reception of a nut $c$, which, together with the king-bolt $d$, holds the parts together. The lower section $b$, to which is secured the axle, turns freely on the boss $a^3$ and between the upper section $a$ and the nut $c$, the central depression $b'$ being located in such position that the entire pivotal connection between the upper and lower sections is located at the rear of the axle.

The nut $c$ has a locking-strap $c'$, extending rearward and adapted to be secured to the upper half $a$ of the coupling to prevent loosening of the nut in the turning movements of the lower section. This nut $c$ has another function and advantage. The recess $b^4$ is finished as to its surface, has a comparatively large area, and is of sufficient depth to permit the nut to enter the member $b$ a considerable distance. By this construction the king-bolt has a long and firm bearing at both its ends in the member $a$, the nut $c$ being securely bolted to the member $a$ through the medium of the locking-strap $c'$. Thus the liability of the king-bolt being bent or the parts of the coupling displaced through the strains applied to the member $b$ is obviated. Furthermore, the nut $c$, when screwed to place and securely bound, maintains a fixed relation to the member $a$ and forms what may be called a "supplemental bearing" for the part $b$. It is obvious that the nut and its locking-strap might be attached and locked to the perch or other convenient part, and so long as it maintains a proper relation to the part $a$ and performs its functions to the part $b$ it would serve the purposes of the invention.

I do not desire to limit myself to the precise means and details of construction shown for forming a double bearing for the movable member $b$ and locking means for the king-bolt.

A flange $b^5$ at the rear of the lower half $b$ of the coupling extends upward into the groove $a^2$, having a sliding fit therein, this flange widening out toward the front and providing a stop for preventing excessive turning movement of the front axle.

The groove $b^3$ in the under side of the forward extension $b^2$ provides means for securing the axle to the device, the peculiar construction of which locates the axle in a high position with reference to the pivotal connection between the parts. The axle may be removably secured in place, thus providing the device with means whereby it may be attached to any vehicle; but this is not absolutely essential, as any means of securing said extension and axle together may be employed.

I claim as my invention—

1. In a carriage-coupling in combination, an upper section adapted to be secured to a perch or like part and having a boss with a wide bearing-surface in front of the boss and a groove at the rear of said boss, a lower section having a recess for the reception of the boss the front wall of the recess forming a wide step coöperating with said bearing-surface and the rear wall of the recess forming a flange located in said groove, and means for holding said sections together.

2. In a carriage-coupling in combination, an upper section adapted to be secured to a perch or like part, and having a boss with a wide bearing-surface in front of the boss and a groove at the rear of said boss, a lower section having a recess for the reception of the boss, the front wall of the recess forming a wide step coöperating with said bearing-surface and having a groove forming a seat for an axle directly underneath the bearing-surface, and the rear wall of the recess forming a flange located in said groove, and means for holding the sections together.

CHARLES T. McCUE.

Witnesses:
R. D. WOODFORD,
ARTHUR B. JENKINS.